Patented Apr. 13, 1926.

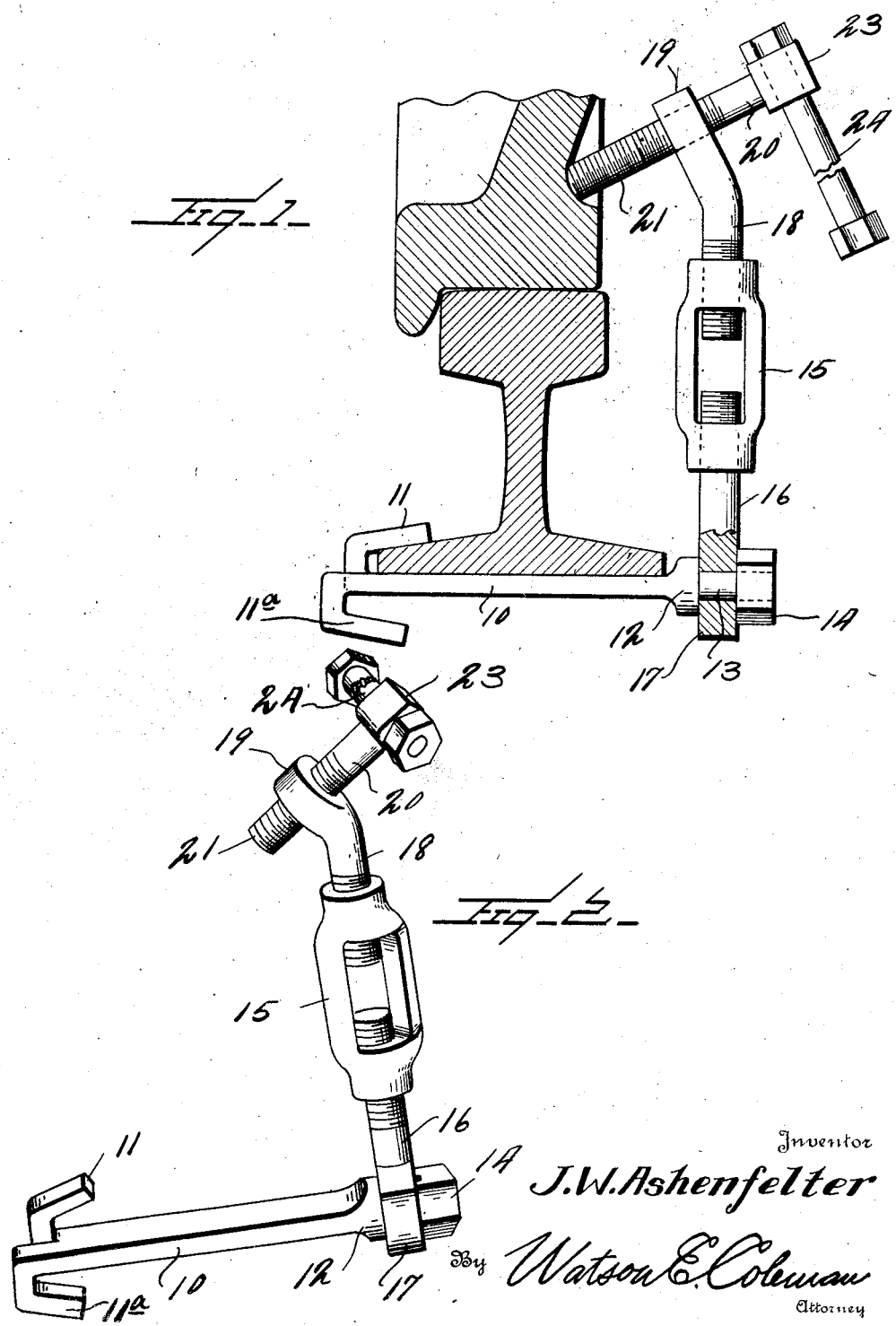

1,580,275

UNITED STATES PATENT OFFICE.

JOSEPH W. ASHENFELTER, OF ALBERTON, MONTANA.

CLAMPING DEVICE FOR CAR WHEELS.

Application filed April 9, 1925. Serial No. 21,910.

*To all whom it may concern:*

Be it known that I, JOSEPH W. ASHENFELTER, a citizen of the United States, residing at Alberton, in the county of Mineral and State of Montana, have invented certain new and useful Improvements in Clamping Devices for Car Wheels, of which the following is a specification, reference being had to the accompanying drawings.

This invention relates to clamping devices, and particularly to means for clamping a car wheel upon a rail.

The main object of the invention is to provide a very simple and effective clamp for holding the car wheel solid upon a rail while a jack is being used in order to raise the dogs to relieve the wedge and brasses.

A further object is to provide a device of this character which includes a clamping member which is adapted to engage beneath the rail and engage the flange thereof, a vertical portion which includes a turnbuckle, and a rail-engaging member engaged with the turnbuckle and having a screw-operated clamp adapted to engage the hollow in the car wheel adjacent the tread of the wheel so that the wheel is held from raising while the truck or allied parts are being operated on.

My invention is illustrated in the accompanying drawing, wherein:—

Figure 1 is a fragmentary sectional view through a wheel and rail showing my invention applied thereto for the purpose of holding the wheel down upon the rail;

Figure 2 is a perspective view of the wheel clamping device.

Referring to this drawing, 10 designates a rail-engaging member consisting of a flat bar, one end of which is bent over, as at 11, to engage over one flange of the rail and the opposite end having a shoulder 12, a reduced portion 13, and a head in the form of a nut 14. Extending at right angles to this member 10 is a link comprising a turnbuckle 15 having interiorly screw-threaded ends, as usual, a screw section 16 exteriorly screw-threaded at one end for engagement with the interior screw-threads at one end of the turnbuckle, and at its opposite end formed with an eye 17 which engages over the reduced portion 13 of the member 10.

Having screw-threaded engagement with the upper end of the turnbuckle 15 is the section 18 which at its upper end is formed with an eye 19, which eye is angularly bent and interiorly screw-threaded. Engaging through this interior screw-threaded eye is a clamp screw 20 which, for a considerable distance, is screw-threaded, as at 21, and the shank of this clamping screw at its end remote from the screw-threads is formed with a head 23 having a transverse aperture through which slidingly passes the handle 24. It will be obvious that by turning this handle the clamp screw 20 may be forced inward or turned outward with relation to the eye 19. This handle is slidingly mounted through the head 23 so as to permit the handle to be shifted either with the head in a middle position or shifted so that in any cramped quarters the head may be turned a portion of a circle and then a new hold taken, the handle being operated in the same manner as a vise handle is operated.

The object of this invention, as before remarked, is to hold a car wheel solid on the rail while a jack is being used, and when it is desired to use this device the bar 10 is disposed beneath the rail with the hook 11 engaging over one flange of the rail. The clamp screw is then turned inward until it engages with the hollow part of a wheel adjacent the tread and as the clamp screw is turned inward it will tend to pull upward on the link formed of the parts 15, 16 and 18 and thus the clamp will hold the wheel down firmly and solidly upon the rail, as illustrated.

While I do not wish to be limited to this, preferably the member 10 is provided with two hooks 11 and 11ª extending in opposite directions, one of these hooks extending beyond the other hook so as to adapt the device to be used with rails having flanges of different widths. The use of either of these hooks is permitted by swiveling the member 16 to the portion 13. The turnbuckle is merely used for coarse adjustment of the height of the clamping device and also permits the bolt 21 to be placed in any position desired by turning the head 18 in the turnbuckle. One of the objects in having the member 16 pivotally connected to the shank 12 is to permit the clamping device to be laid flat on the ground while the member 10 is disposed under the rail flange.

I claim:—

1. A car wheel clamp comprising a member adapted to engage beneath and have interlocking engagement with the base flange of a railway rail, a link swingingly engaged with said member for movement in a plane at right angles thereto, the link being adjustable longitudinally and having at its upper end an angularly disposed interiorly screw-threaded eye, and a wheel-engaging screw passing through the angularly disposed eye and adapted to engage a wheel.

2. A railway car wheel clamp of the character described comprising a flat bar adapted to be disposed beneath a railway rail and having a hooked end engageable over the flange of the rail, a link having pivotal engagement with the bar at one end and at its other end having an angularly disposed interiorly screw-threaded eye, and a wheel-engaging clamping screw passing through said eye and having means whereby it may be rotated, the link being formed of a plurality of interconnected screw-threaded members whereby the link may be expanded or contracted.

3. A railway car wheel clamp of the character described comprising a flat bar adapted to be disposed beneath a railway rail and having a hooked end engageable over the flange of the rail, a link having pivotal engagement with the bar at one end and at its other end having an angularly disposed interiorly screw-threaded eye, and a wheel-engaging clamping screw passing through said eye and having means whereby it may be rotated, the link being formed of a turnbuckle and two end members having screw-threaded engagement with the turnbuckle.

4. A clamp of the character described comprising a flat bar having a hook at one end, the bar being adapted to pass beneath a rail and adapted to engage one flange thereof, the opposite end of the bar having a reduced extremity and a nut, a link including a turnbuckle, a member having screw-threaded engagement with one end of the turnbuckle and having an eye through which the reduced extremity of the bar passes, a member having a screw-threaded shank extending through the other end of the turnbuckle, said shank having an angularly disposed interiorly screw-threaded eye, and a clamping screw extending through said eye and having a head formed with a transverse aperture, and a handle having limited sliding movement through said aperture of the head.

5. A car wheel clamp comprising a member adapted to be engaged beneath a railway rail and having at its end a plurality of hooks of different lengths whereby it may have interlocking engagement with rail bases of different widths, a link member pivotally connected to the rail engaging member, and a wheel-engaging screw having screw-threaded engagement with the upper end of the link member and adapted to engage a car wheel.

In testimony whereof I hereunto affix my signature.

JOSEPH W. ASHENFELTER.